United States Patent
Chen et al.

(10) Patent No.: US 11,188,224 B2
(45) Date of Patent: Nov. 30, 2021

(54) CONTROL METHOD OF USER INTERFACE AND ELECTRONIC DEVICE

(71) Applicant: ASUSTeK COMPUTER INC., Taipei (TW)

(72) Inventors: Ya-Ting Chen, Taipei (TW); Chien-Chih Tseng, Taipei (TW); Wei-Tong Lin, Taipei (TW); Chao-Chieh Cheng, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/991,071

(22) Filed: Aug. 12, 2020

(65) Prior Publication Data
US 2021/0064229 A1 Mar. 4, 2021

(30) Foreign Application Priority Data
Aug. 28, 2019 (TW) .................. 108130915

(51) Int. Cl.
*G06F 3/0488* (2013.01)
*G06T 13/00* (2011.01)
(Continued)

(52) U.S. Cl.
CPC ........ *G06F 3/04883* (2013.01); *G06F 3/0482* (2013.01); *G06F 3/04845* (2013.01); *G06T 13/00* (2013.01)

(58) Field of Classification Search
CPC .............. G06F 3/04883; G06F 3/0482; G06F 3/04845; G06T 13/00
See application file for complete search history.

(56) References Cited

U.S. PATENT DOCUMENTS

2010/0306702 A1* 12/2010 Warner ............... G06F 3/04817
715/811
2014/0071063 A1* 3/2014 Kuscher ............. G06F 3/04883
345/173
(Continued)

FOREIGN PATENT DOCUMENTS

CN 102467316 A 5/2012
CN 102654818 B 9/2012
(Continued)

*Primary Examiner* — Seth A Silverman
(74) *Attorney, Agent, or Firm* — McClure, Qualey & Rodack, LLP

(57) ABSTRACT

A controlling method of a user interface and an electronic device are provided. A touch element includes a start area, a trigger area and a track area connecting the start area and the trigger area. The controlling method of the user interface includes following steps: entering a startup interface display mode according to the touch behavior performed on the touch element; generating continuous touch data in response to the touch behavior when the touch behavior moves from the start area to the track area and an animation trigger condition is satisfied, activating an animation mode according to the continuous touch data; and generating the continuous touch data in response to the touch behavior when the touch behavior moves from the start area to the track area and from the track area to the trigger area, and opening a user interface according to the continuous touch data.

17 Claims, 12 Drawing Sheets

(51) Int. Cl.
  *G06F 3/0484* (2013.01)
  *G06F 3/0482* (2013.01)

(56) References Cited

U.S. PATENT DOCUMENTS

| | | |
|---|---|---|
| 2014/0298237 A1 | 10/2014 | Galu, Jr. |
| 2015/0370427 A1* | 12/2015 | Zhang ................ G06F 3/04817 715/835 |
| 2016/0147433 A1* | 5/2016 | Lin ...................... G06F 3/0482 715/834 |

FOREIGN PATENT DOCUMENTS

| | | |
|---|---|---|
| TW | 200839592 | 10/2008 |
| TW | 200839592 A | 10/2008 |

* cited by examiner

US 11,188,224 B2

CONTROL METHOD OF USER INTERFACE AND ELECTRONIC DEVICE

CROSS-REFERENCE TO RELATED APPLICATION

This application claims the priority benefit of Taiwan applications serial No. 108130915, filed on Aug. 28, 2019. The entirety of the above-mentioned patent application is hereby incorporated by reference herein and made a part of specification.

BACKGROUND OF THE INVENTION

Field of the Invention

The invention relates to a control method of a user interface and an electronic device.

Description of the Related Art

Touchpads generally support single-finger or multi-finger gestures to activate the computer system operations. However, with the rapid development of notebook computers, the touchpad of the notebook computers often provides different input functions. For example, in a small notebook computer, the touchpad also provides a numeric interface for entering numeric keys, to make up for the lack of independent numeric keys region on the keyboard of the small notebook. However, when the user interface with other functions is added to the touchpad, the function switching is inconvenient, and even input errors is caused due to incorrectly selecting the user interface.

BRIEF SUMMARY OF THE INVENTION

According to the first aspect, a controlling method of a user interface applied to an electronic device is provided. The electronic device includes a touch element and a screen, and the touch element includes a start area, a trigger area, and a track area connecting the start area and the trigger area. The controlling method of the user interface includes following steps: entering a startup interface display mode according to the touch behavior performed on the touch element; generating continuous touch data in response to the touch behavior when the touch behavior moves from the start area to the track area and an animation trigger condition is satisfied, activating an animation mode according to the continuous touch data; and generating the continuous touch data in response to the touch behavior when the touch behavior moves from the start area to the track area and from the track area to the trigger area, and opening a user interface according to the continuous touch data.

According to the second aspect, an electronic device is provided. The electronic device includes a screen, a touch element and a processor. A touch element includes a start area, a trigger area and a track area connecting the start area and the trigger area. The touch element is configured to generate a continuous touch data in response to a touch behavior. The processor is electrically connected with the screen and the touch element. The processor enters a startup interface display mode according to the touch behavior. the processor activates an animation mode according to the continuous touch data when the touch behavior moves from the start area to the track area and an animation trigger condition is satisfied, and when the touch behavior moves from the start area to the track area and from the track area to the trigger area, the processor opens a user interface according to the continuous touch data.

In summary, a control method of a user interface and an electronic device are provided, which matches the user interface of the application with gestures without affecting the original operation, to increase user experience and enhance convenience.

These and other features, aspects and advantages of the present invention will become better understood with regard to the following description, appended claims, and accompanying drawings.

DETAILED DESCRIPTION OF THE EMBODIMENTS

Figure 1:
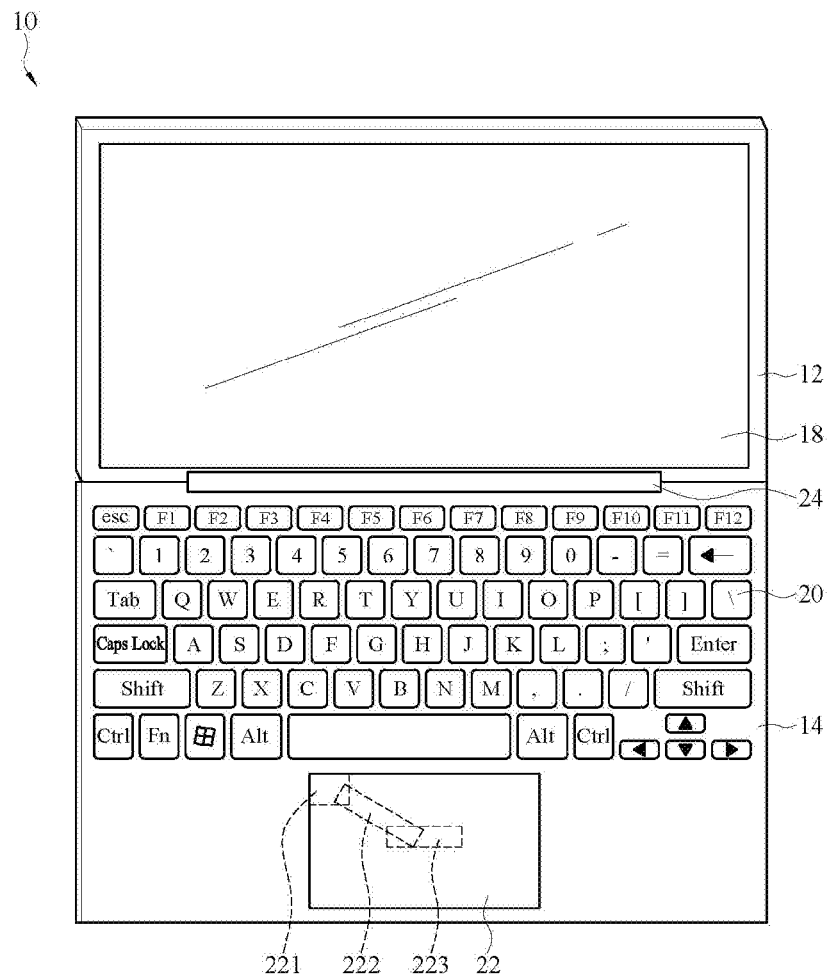
FIG. 1 is a schematic diagram of an electronic device in an embodiment.
Figure 2:
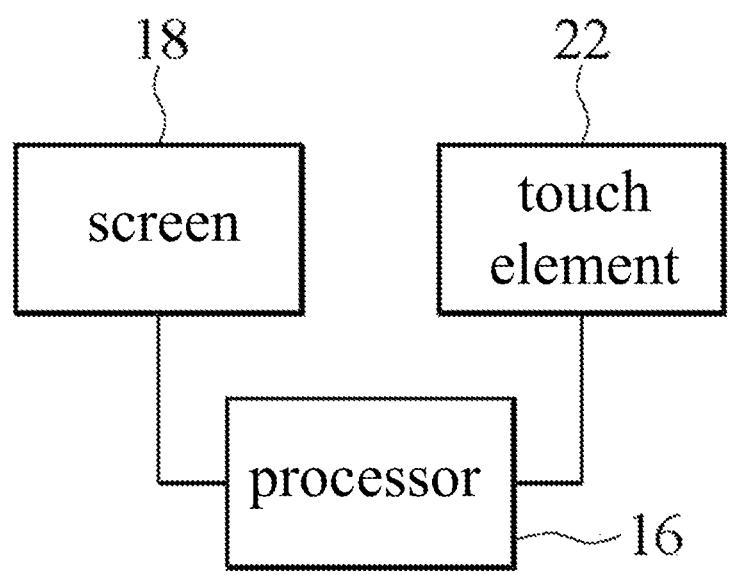
FIG. 2 is a block diagram of an electronic device of an embodiment.

FIG. 1 is a schematic diagram of an electronic device in an embodiment. FIG. 2 is a block diagram of an electronic device of an embodiment. Please refer to FIG. 1 and FIG. 2, the electronic device 10 includes a first casing 12, a second casing 14, and the processor 16. The first casing 12 includes a screen 18, and the second casing 14 includes a keyboard 20 and a touch element 22. The first casing 12 and the second casing 14 are connected to each other by a connecting portion 24 and are rotatable through the connecting portion 24. The processor 16 is electrically connected to the screen 18 and the touch element 22. In one embodiment, the touch element 22 is a touch display. In an embodiment, the processor 16 is integrated in the second casing 14, which is not limited herein. In an embodiment, the electronic device 10 is, but not limited to, a notebook computer.

In one embodiment, the screen 18 is a display, and the user performs various kinds of the touch behavior on the touch element 22. In one embodiment, the touch element 22 is a touch panel or a touch display, which is not limited herein. In one embodiment, the screen 18 is a touch display, a user performs various kinds of touch behavior on the screen 18 or the touch element 22.

In an embodiment, the processor 16 is implemented using a system on chip (SoC), a microcontroller (MCU), a central processing unit (CPU), or an application specific integrated circuit (ASIC).

Figure 3:
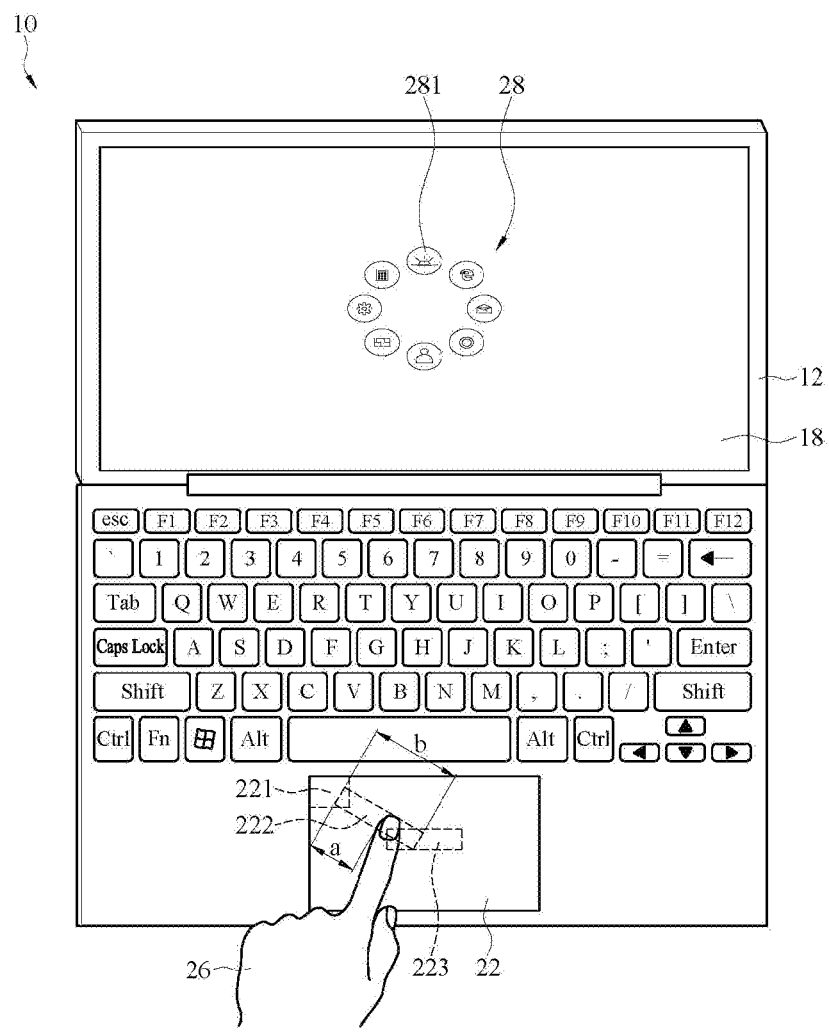
FIG. 3 is a schematic diagram of an electronic device executing an animation mode in an embodiment.
Figure 4:
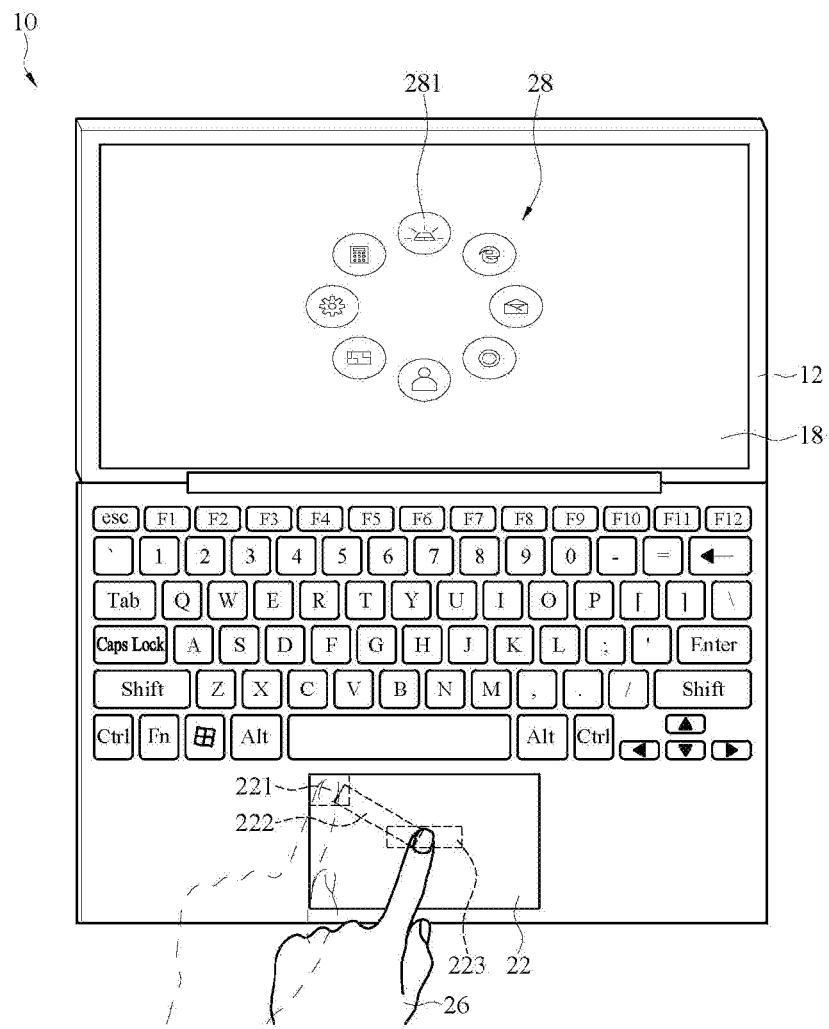
FIG. 4 is a schematic diagram of an electronic device implementing a user interface in an embodiment.

In an embodiment, the screen 18 displays an image, and the touch element 22 includes a start area 221, a trigger area 223, and a track area 222 connecting the start area 221 and the trigger area 223. The processor 16 enters a startup interface display mode according to the touch behavior performed on the touch element 22. In an embodiment, the start area 221, the track area 222, and the trigger area 223 are rectangular, circular, triangular, polygonal, or any other shape, which is not limited herein. In one embodiment, the touch element 22 generates touch data in response to the touch behavior. The touch data at least includes touch location information (such as touch coordinates), so that the processor 16 determines the position touched by the user's finger 26 according to the touch data to perform corresponding operations. When the touch behavior moves from the start area 221 to the track area 222 and meets an animation trigger condition, as shown in FIG. 3, the touch element 22 generates corresponding continuous touch data in response to the touch behavior, so that the processor 16 receives and executes an animation mode according to the continuous touch data. Then, as shown in FIG. 4, when the touch behavior moves from the start area 221 to the track area 222 and form the track area 222 to the trigger area 223, the touch element 22 responds to the touch behavior to generate the corresponding continuous touch data, so that the processor 16 receives and opens a user interface 28 according to the continuous touch data.

Figure 5:
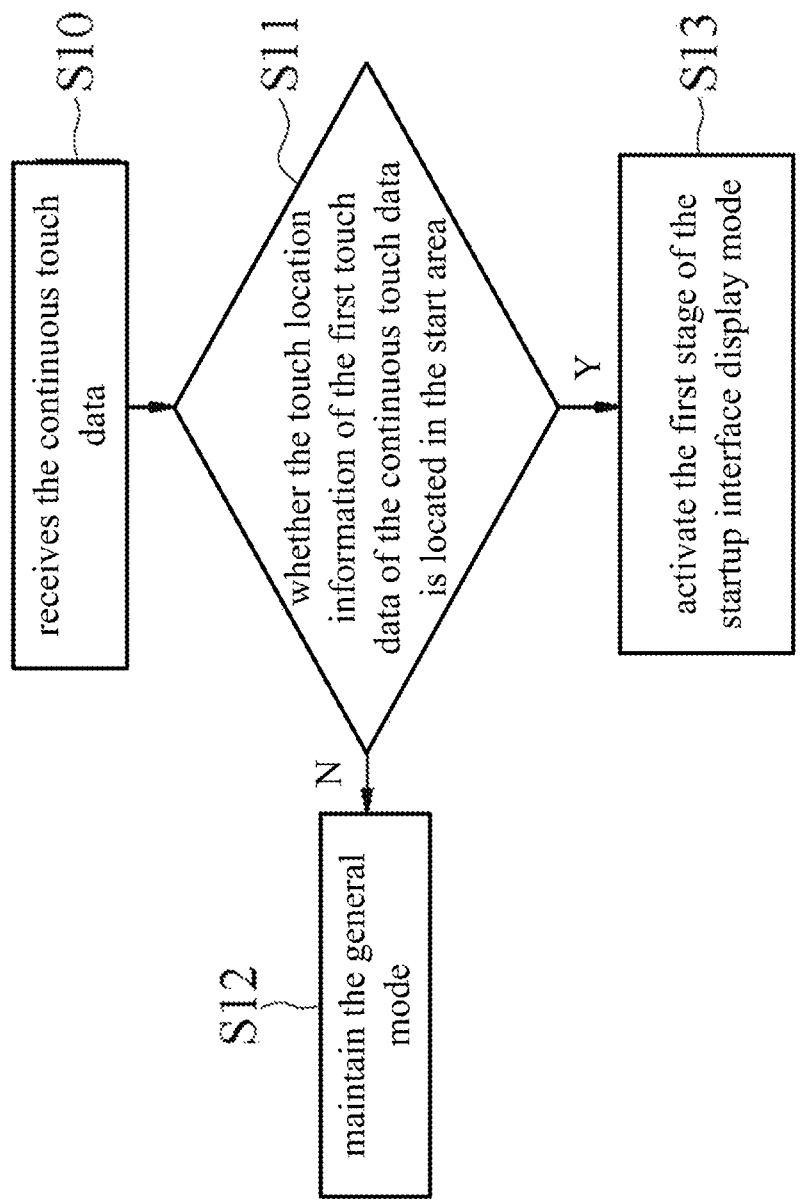
FIG. 5 is a schematic flowchart of determining whether to enter a startup interface display mode in a control method of a user interface in an embodiment.
Figure 6:
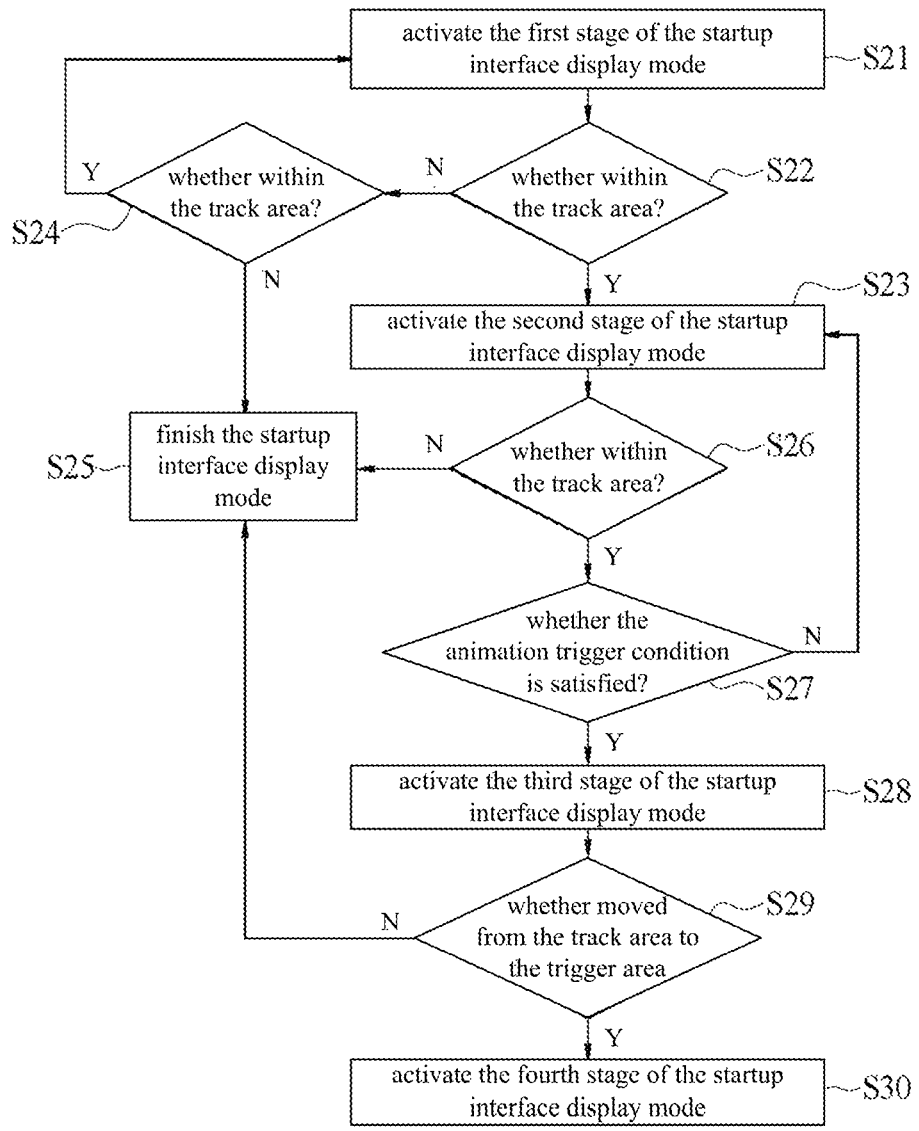
FIG. 6 is a schematic flowchart of starting a user interface in a control method of a user interface in an embodiment.

FIG. 5 is a schematic flowchart of determining whether to enter a startup interface display mode in a control method of a user interface in an embodiment. Please refer to FIG. 1 to FIG. 5 the electronic device 10 executes the control methods shown in FIG. 5 and FIG. 6. The initial state is that the processor 16 determines that the touch element 22 is in a general mode (Stage=0), such as a touchpad mode. Next, the processor 16 receives the continuous touch data generated by the touch element 22 in response to a touch behavior (step S10). Next, the processor 16 determines whether the touch location information of the first touch data of the continuous touch data is located in the start area 221 (step S11). When it is determined that the touch location information of the first touch data of the continuous touch data is not located in the start area 221, the touch element 22 is maintained in the general mode and perform subsequent corresponding operations (step S12). When the processor 16 determines that the touch location information of the first touch data of the continuous touch data is in the start area 221, the processor 16 determines that the touch element 22 enters the first stage of the startup interface display mode (Stage=1) (Step S13). In an embodiment, each touch data in the continuous touch data includes touch location information respectively.

Please refer to FIGS. 1 to 4 and FIG. 6. When entering the first stage of the startup interface display mode, the processor 16 determines whether the touch location information of the first subsequent touch data of the continuous touch data is within the track area 222 (step S22). The first subsequent touch data refers to the touch data generated by the touch element 22 in response to the touch behavior after entering the first stage of the startup interface display mode. When the touch location information of the first subsequent touch data is located in the track area 222, it means that the touch behavior moved from the start area 221 to the track area 222. At this time, the touch element 22 enters the second stage of the startup interface display mode (Stage=2) (step S23); When the touch location information of the first subsequent touch data is not located in the track area 222, the processor 16 determines whether the touch location information of the first subsequent touch data is still located in the start area 221 (step S24). When it is determined that the touch location information of the first subsequent touch data is still located in the start area 221, the first stage of the startup interface display mode (step S21) is maintained; when it is determined that the touch location information of the first subsequent touch data is not within the start area 221, close the startup interface display mode and return to the normal mode are performed (step S25).

When entering the second stage of the startup interface display mode, the processor 16 determines whether the touch location information of the second subsequent touch data of the continuous touch data is located in the track area 222 (step S26). The second subsequent touch data refers to the touch data generated by the touch element 22 in response to the touch behavior after entering the second stage of the startup interface display mode. When it is determined that the touch location information of the second subsequent touch data is not within the track area 222, close the startup interface display mode and return to the normal mode are performed (step S25). When the touch location information of the second subsequent touch data is within the track area 222, the processor 16 determines whether the animation trigger condition is satisfied (step S27). When the touch location information of the second subsequent touch data is in the track area 222 but the animation trigger condition is not satisfied, the second stage of the startup interface display mode (step S23) is maintained; When the touch location information of the second subsequent touch data is located in the track area 222 and the animation trigger condition is satisfied, enter a third stage of the startup interface display mode is performed (Stage=3) (Step S28). At the third stage, the animation mode of the user interface 28 as shown in FIG. 3 is started to display the animation on the screen 18.

Next, the processor 16 determines whether the touch location information of the third subsequent touch data in the continuous touch data is moved from the track area 222 to the trigger area 223 (step S29). The third subsequent touch data refers to the touch data generated by the touch element 22 in response to the touch behavior after entering the third stage of the startup interface display mode. When the touch location information of the third subsequent touch data is not moved from the track area 222 to the trigger area 223, the startup interface display mode (step S25) is closed. When the touch location information of the third subsequent touch data is moved from the track area 222 to the trigger area 223 (which indicates that the touch behavior moves from the start area 221 to the track area 222 and from the track area 222 to the trigger area 223 in sequence), enter the fourth stage (Stage=4) of the startup interface display mode is performed (step S30), and stop the animation mode and fully start the user interface 28 at the fourth stage are performed. At this time, a stable screen of the user interface 28 (as shown in FIG. 4) is displayed on the screen 18, and the user interface 28 is overlaid on the original image of the screen 18 to be displayed on the top layer.

In one embodiment, requires when both the direction and the distance of the touch behavior meet a condition, the animation trigger condition is satisfied, such as sliding a sufficient distance in a specific direction. Please refer to FIG. 3, the touch location information of the continuous touch data generated in response to the touch behavior is a vector $\bar{a}$ moving from the track area 222 toward the trigger area 223, and the length of the track area 222 is b, and then the animation trigger condition is $T1<|\bar{a}|/b<T2$. In an embodiment, $T1=0.5$ and $T2=1$, the animation mode is executed when the touch location information is located in the track area 222 and the animation trigger condition (sliding a sufficient distance in a specific direction) is satisfied.

In one embodiment, the animation mode makes the user interface 28 to appear progressively on the screen 18 according to the direction and distance of the touch behavior, which is not limited herein. In other embodiments, the user interface 28 has different presentation modes according to the direction, distance, speed, or pressing force of the touch behavior when the animation mode is activated. In one embodiment, the user interface 28 presents a color changing effect such as changing the color of the user interface 28 from light to dark, from dark to light, or from the first color to the second color when the animation mode is activated and at least one of the direction, distance, speed, or pressing force of the touch behavior changes from small to large. In another embodiment, when the animation mode is activated, the user interface 28 presents a size change effect such as changing the size of the user interface 28 from small to large according to at least one of the direction, distance, speed, or pressing force of the touch behavior. In another embodiment, when the animation mode is activated, the user interface 28 presents a transparency change effect such as changing the user interface 28 from fully transparent to semi-transparent, and then from semi-transparent to opaque according to at least one of the direction, distance, speed or pressing force of the touch behavior changes from small to large. In another embodiment, when the animation mode is activated, the user interface 28 presents a shape change effect such as gradually changing the shape of the user interface 28 from a first shape (such as a shape of diamond) to a second shape (such as a shape of circle) according to at least one of the direction, distance, speed, or pressing force of the touch behavior changes from small to large.

Please refer to FIG. 4. The user interface 28 has a plurality of the interface icons 281, and the interface icons 281 has a different pattern and represents an application respectively. In an embodiment, a plurality of the interface icons 281 on the user interface 28 are arranged in a closed ring. When the user interface 28 is activated and the touch element 22 continuously senses the touch behavior, the processor 16 determines which one of the interface icons 281 is selected according to the touch behavior and triggers the function of the selected interface icon 281. In one embodiment, the touch location information of the touch data generated by the touch element 22 in response to the touch behavior is converted from the touch element coordinate information (such as the coordinate system of the touch element 22) to the user interface coordinate information (such as the coordinate system of the user interface 28), to trigger the application function of the interface icon 281 of the user interface 28 which is to be triggered by the touch behavior.

Specifically, in an embodiment, the processor 16 includes a driving unit and a user interface processing unit corresponding to the user interface 28. When the user interface 28 is opened and the touch element 22 continuously senses the touch behavior, the processor 16 transmits the touch element coordinate information of the touch behavior to the user interface processing unit through the driving unit. Then, the processor 16 converts the touch element coordinate information into the user interface coordinate information by the user interface processing unit, and triggers the function of the interface icon 281 according to the user interface coordinate information.

In an embodiment, the screen 18 is a touch display. When the user interface 28 is activated and displayed on the screen 18, the user directly performs a second touch behavior on the screen 18, and then the touch location information of the touch data generated by the screen 18 in response to the second touch behavior is converted. The touch location information is converted from the screen coordinate information (that is, the coordinate in the coordinate system of the screen 18) to the user interface coordinate information (that is, the coordinate in the coordinate system of the user interface 28), to trigger the application function of the interface icon 281 which selected by the second touch behavior. Specifically, when the user interface 28 is opened and displayed on the screen 18, the processor 16 transmits the screen coordinate information corresponding to the second touch behavior to the user interface application corresponding to the user interface 28 through a driving application, and then the processor 16 converts the screen coordinate information into the user interface coordinate information by the user interface application, and triggers the application function of the interface icon 281 according to the user interface coordinate information.

Figure 7:
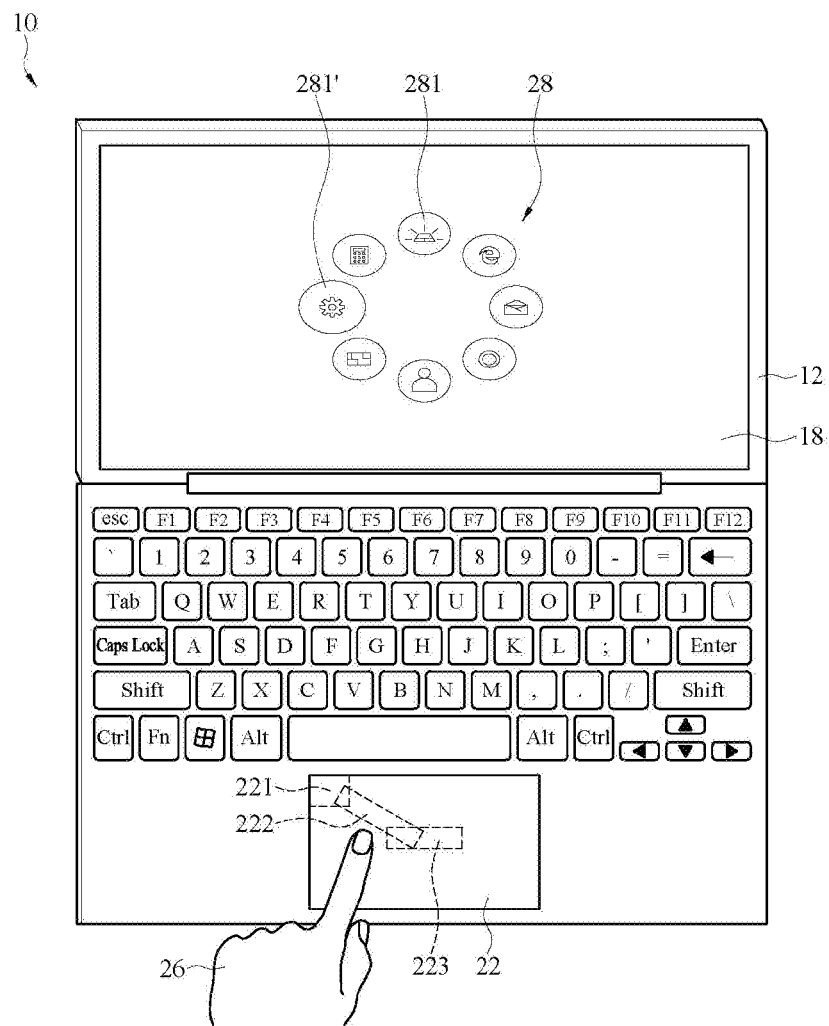
FIG. 7 is a schematic diagram of an electronic device selecting an interface icon in an embodiment.

In one embodiment, when the user interface 28 is displayed on the screen 18, multiple interface icons 281 are presented in a circular arrangement on the screen 18. To select one of the interface icon 281' at this time, the second touch behavior needs to be performed on the touch element 22 (in an embodiment: a finger 26 slides into a responding area of the interface icon 281' in the touch element). When the driving application of the processor 16 receives the touch data generated by the touch element 22 in response to the second touch behavior, enlarge the corresponding interface icon 281'. Please refer to FIG. 7, the enlarged interface icon 281' represents that it is selected by the user. Then, when the finger leaves the responding area of the interface icon 281', the processor 16 executes the application corresponding to the interface icon 281'. When the interface icon 281' is selected and executed, the user interface 28 is automatically closed, which means that the entire interface display mode is ended. In an embodiment, the actual size of each interface icon 281 in the user interface 28 and the corresponding responding area of the interface icons 281 are not completely the same. For example, the responding area of the interface icon 281' is larger than the actual size of the interface icon 281'.

In one embodiment, when the user interface 28 is displayed on the screen 18, if no interface icon 281 is selected, and the finger 26 leaves the touch element 22 (that is, the touch behavior ends), or the finger 26 leaves the touch element 22 for a preset time (that is, the touch behavior ends and after the preset time), the user interface 28 is automatically closed.

Figure 8:
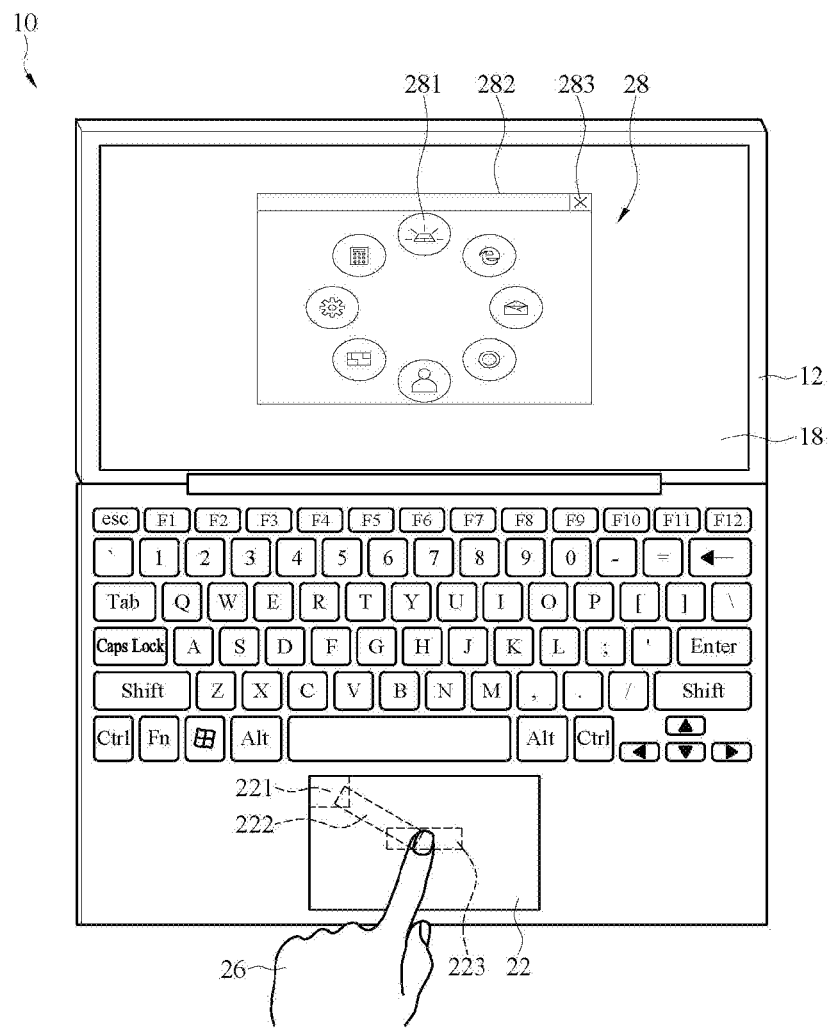
FIG. 8 is a schematic diagram of an electronic device implementing a user interface in another embodiment.

In one embodiment, please refer to FIG. 8. The user interface 28 further includes a close button 283 to close the user interface 28. When the user interface 28 is displayed on the screen 18, a window 282 is further provided around the interface icons 281 arranged in a ring, and a close button 283 is provided at the upper right corner of the window 282. When the user does not select any one of the interface icon 281 and wants to leave the user interface 28, he or she just needs to click the close button 283 to close the user interface 28.

Figure 9:
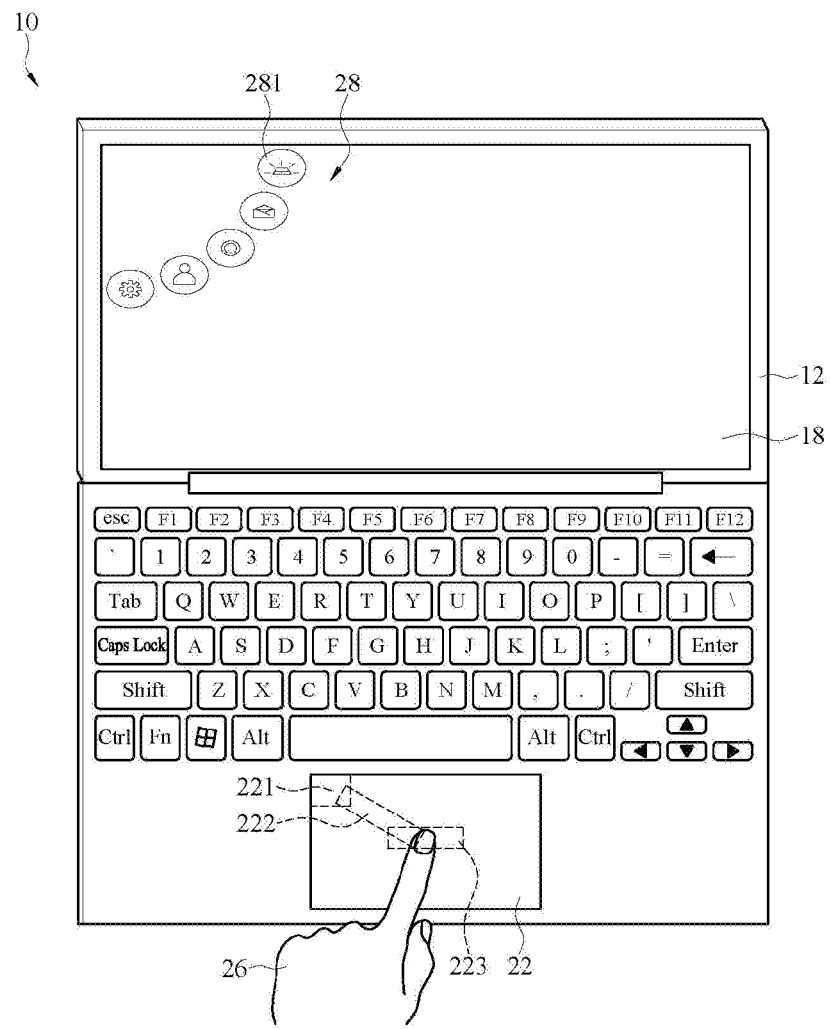
FIG. 9 is a schematic diagram of an electronic device implementing the user interface in another embodiment.

In an embodiment, a plurality of the interface icons 281 on the user interface 28 are arranged in different shapes, not limited to the ring shape in the foregoing embodiment. Please refer to FIG. 9, in an embodiment, the interface icons 281 are centered on the upper left corner and arranged in an arc shape, which is not limited herein. Except for the different arrangement methods, the other control methods and operations are the same as those in the previous embodiment, which will not be repeated here.

Figure 10:
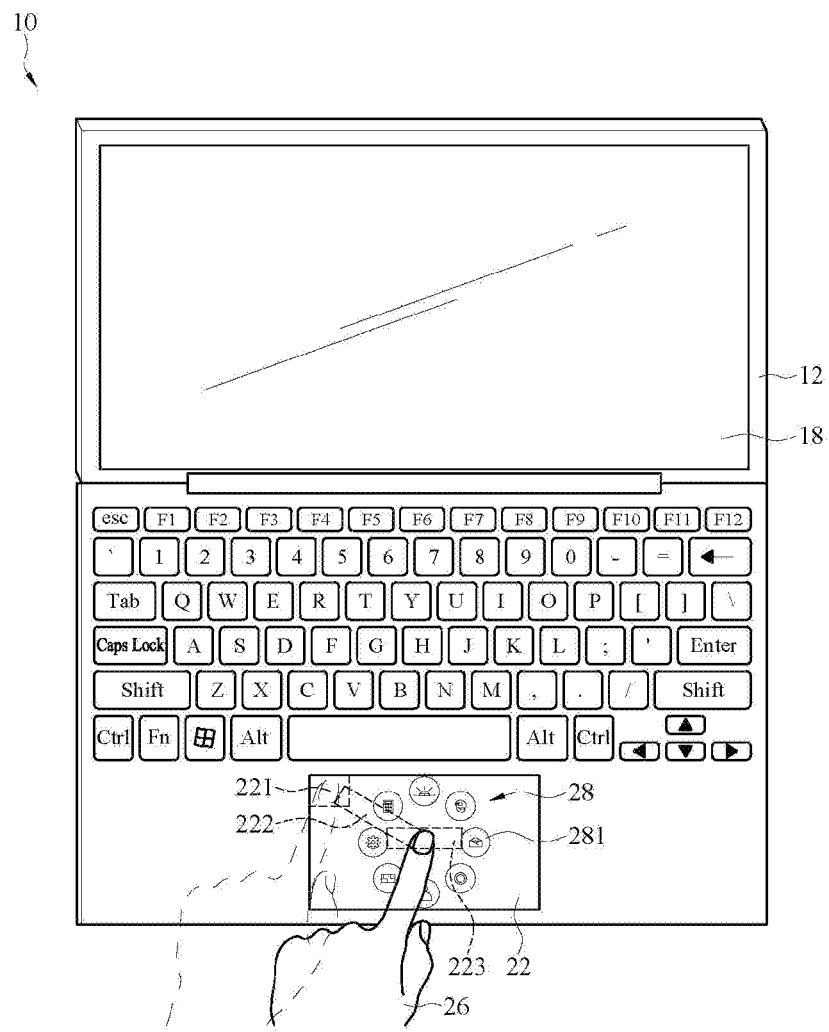
FIG. 10 is a schematic diagram of an electronic device implementing a user interface in another embodiment.

Please refer to FIG. 2 and FIG. 10. The control method of FIG. 10 is almost the same as that of FIG. 4. The main difference between FIG. 10 and FIG. 4 is that the user interface 28 opened by the touch behavior sequentially moving from the start area 221 to the track area 222 to the trigger area 223 on the touch area 22 is directly presented on the touch element 22 in FIG. 10. The user sees the user interface 28 on the touch element 22 and controls it at the same time to select the interface icon 281 by performing a touch behavior.

Figure 11:
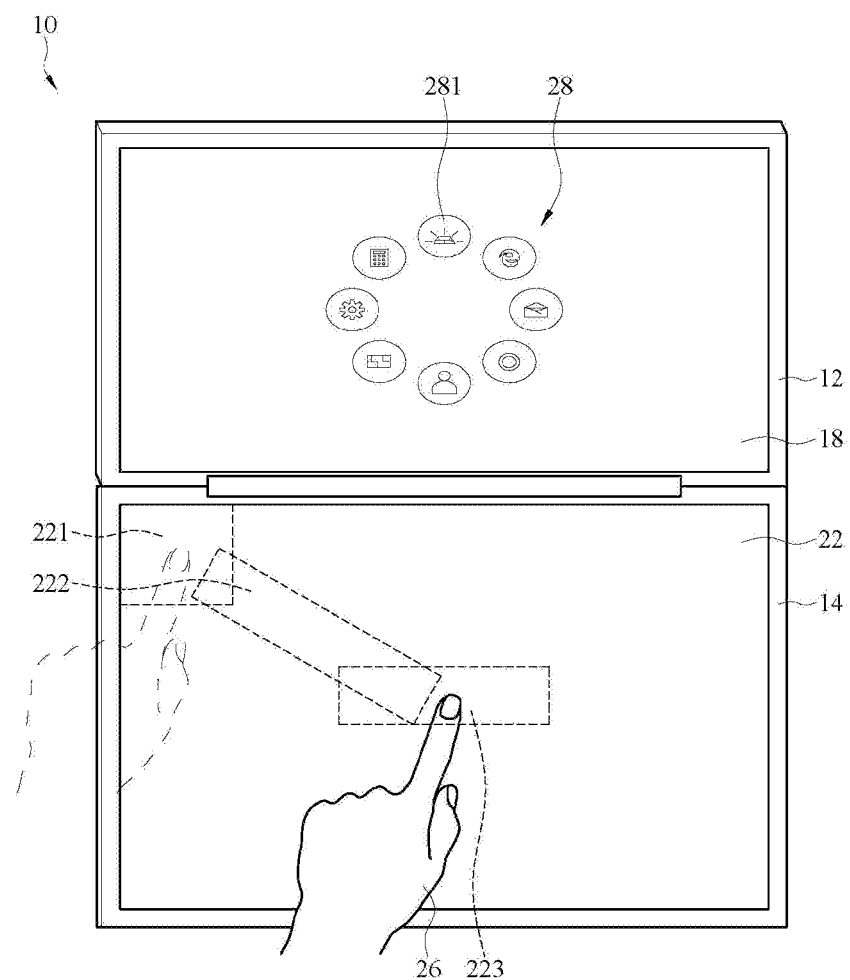
FIG. 11 is a schematic diagram of the electronic device in another embodiment.
Figure 12:
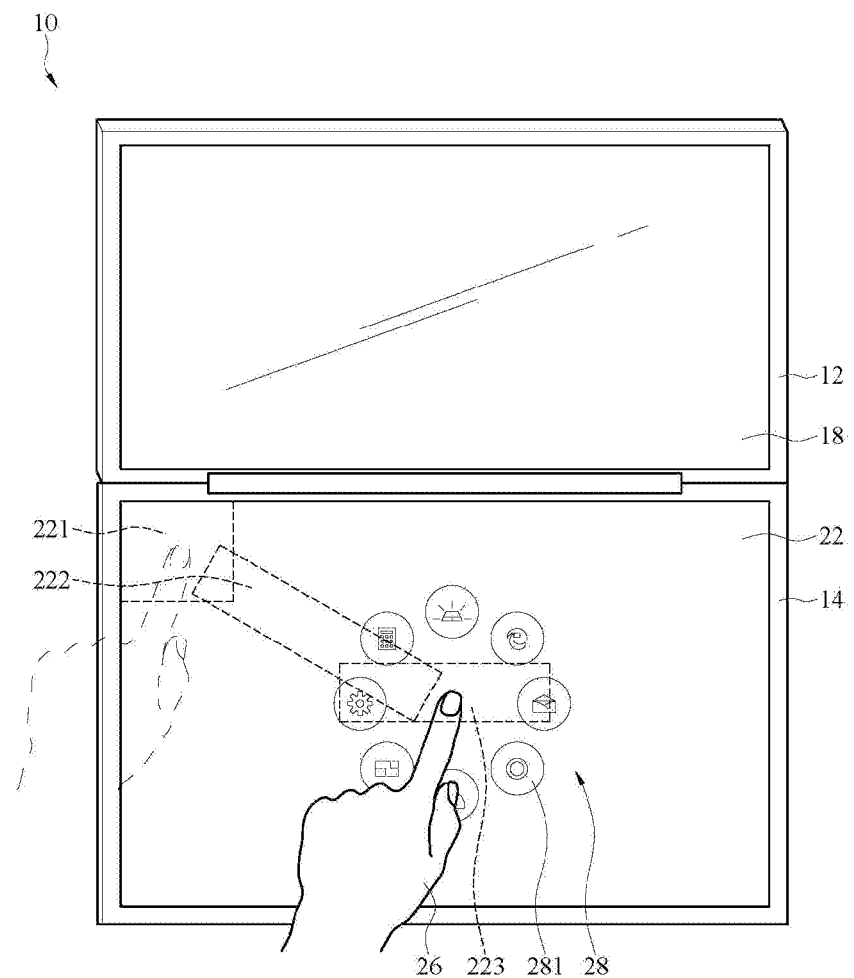
FIG. 12 is a schematic diagram of the electronic device in another embodiment.

FIG. 11 is a schematic diagram of the electronic device in another embodiment. FIG. 12 is a schematic diagram of the electronic device in another embodiment. Please refer to FIG. 2, FIG. 11 and FIG. 12. In the electronic device 10, the first casing 12 includes the screen 18, and the second casing 14 only includes the touch element 22. The processor 16 is electrically connected to the screen 18 and the touch element 22, and the processor 16 is integrated in the second casing 14, which is not limited herein. The touch element 22 includes the start area 221, the track area 222 and the trigger area 223 and generates a corresponding continuous touch data in response to a touch behavior. When the touch behavior is moving from the start area 221 to the track area 222 and then moving from the track area 222 to the trigger area 223, the touch element 22 generates the continuous touch data responding to the touch behavior, so that the processor 16 activates the user interface 28 according to the continuous touch data, and displays the user interface 28 on the screen 18 as shown in FIG. 11, or displays the user interface 28 on the touch element 22 as shown in FIG. 12. For other related control methods and presentation methods, reference may be made to the detailed description of the previous embodiment, and no further description will be given here. In some implementations, the screen 18 is a general display screen or a touch display.

Therefore, a control method and the electronic device in this disclosure provide a convenient and intuitive multiple user interface on the touch element. The user can gradually open the user interface by performing a touch behavior to optimize the user experience.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A controlling method of a user interface, applied to an electronic device, the electronic device includes a touch element and a screen, the touch element includes a start area, a trigger area, and a track area connecting the start area and the trigger area, the controlling method comprising:
    entering a startup interface display mode according to touch behavior performed on the touch element using a single finger, wherein entering the startup interface display mode comprises:
        generating a continuous touch data in response to the touch behavior; and
        entering a first stage of the startup interface display mode when the touch location information of a first touch data in the continuous touch data is in the start area;
    generating continuous touch data in response to the touch behavior when the touch behavior moves from the start area to the track area and an animation trigger condition is satisfied, activating an animation mode according to the continuous touch data, wherein activating the animation mode comprises:
        entering a second stage of the startup interface display mode when the touch location information of a first subsequent touch data in the continuous touch data is in the track area; and
        entering a third stage of the startup interface display mode and activating the animation mode at the third stage when the touch location information of a second subsequent touch data in the continuous touch data is in the track area and the animation trigger condition is satisfied; and
    generating the continuous touch data in response to the touch behavior when the touch behavior moves from the start area to the track area and from the track area to the trigger area, and opening a user interface according to the continuous touch data, wherein the user interface includes a close button to close the user interface.

2. The controlling method of the user interface according to claim 1, wherein the user interface includes a plurality of interface icons, when the user interface is opened and the touch element continuously senses the touch behavior, one of the plurality of interface icons is selected according to the touch behavior and the function of the selected interface icon is triggered.

3. The controlling method of the user interface according to claim 1, wherein the animation mode is color change, size change, transparency change or shape change of the user interface.

4. The controlling method of the user interface according to claim 3, wherein the user interface is automatically closed when one of the plurality of interface icons is selected according to the touch behavior and the function of the selected interface icon is triggered.

5. The controlling method of the user interface according to claim 1, wherein the user interface is displayed on the touch element or the screen.

6. The controlling method of the user interface according to claim 5, wherein the screen is a touch display.

7. The controlling method of the user interface according to claim 1, wherein after the touch behavior ends or a predetermined period of time after the touch behavior ends, the user interface is automatically closed.

8. The controlling method of the user interface according to claim 1, wherein the step of opening the user interface further comprises:
    entering a fourth stage of the startup interface display mode, stopping the animation mode and fully starting the user interface at the fourth stage when the touch location information of a third subsequent touch data in the continuous touch data moves from the track area to the trigger area.

9. An electronic device, comprising:
    a screen;
    a touch element, including a start area, a trigger area and a track area connecting the start area and the trigger area, the touch element is configured to generate a continuous touch data in response to a touch behavior using a single finger; and a processor, electrically connected with the screen and the touch element, the processor enters a startup interface display mode according to the touch behavior, wherein the processor enters the startup interface display mode by:

generating a continuous touch data in response to the touch behavior; and entering a first stage of the startup interface display mode when the touch location information of a first touch data in the continuous touch data is in the start area;

wherein, the processor activates an animation mode according to the continuous touch data when the touch behavior moves from the start area to the track area and an animation trigger condition is satisfied, wherein the processor activates the animation mode by:

entering a second stage of the startup interface display mode when the touch location information of a first subsequent touch data in the continuous touch data is in the track area; and entering a third stage of the startup interface display mode and activating the animation mode at the third stage when the touch location information of a second subsequent touch data in the continuous touch data is in the track area and the animation trigger condition is satisfied, and when the touch behavior moves from the start area to the track area and from the track area to the trigger area, the processor opens a user interface according to the continuous touch data, wherein the user interface includes a close button to close the user interface.

10. The electronic device according to claim 9, wherein the user interface includes a plurality of interface icons, when the user interface is opened and the touch element continuously senses the touch behavior, the processor determines which one of the interface icons is selected according to the touch behavior and triggers the function of the selected interface icon.

11. The electronic device according to claim 10, wherein the user interface is automatically closed when one of the plurality of interface icons is selected according to the touch behavior and the function of the selected interface icon is triggered.

12. The electronic device according to claim 10, wherein the processor includes a driving unit and a user interface processing unit corresponding to the user interface, the processor transmits touch element coordinate information of corresponding to the touch behavior to the user interface processing unit through the driving unit, converts the touch element coordinate information to the user interface coordinate information by the user interface processing unit, and then triggers the function of the selected interface icon according to the user interface coordinate information.

13. The electronic device according to claim 9, wherein the animation mode is color change, size change, transparency change or shape change of the user interface.

14. The electronic device according to claim 9, wherein the user interface is displayed on the touch element or the screen.

15. The electronic device according to claim 14, wherein the screen is a touch display.

16. The electronic device according to claim 9, wherein after the touch behavior ends or a predetermined period of time passes after the touch behavior ends, the user interface is automatically closed.

17. The electronic device according to claim 9, wherein the step of activating the user interface further comprises:

entering a fourth stage of the startup interface display mode, stopping the animation mode and fully starting the user interface at the fourth stage when the touch location information of a third subsequent touch data in the continuous touch data moves from the track area to the trigger area.

* * * * *